United States Patent [19]
Oshima et al.

[11] Patent Number: 5,120,210
[45] Date of Patent: Jun. 9, 1992

[54] CORE STRUCTURE FOR PRODUCING CLOSED END SLEEVE

[75] Inventors: Shinji Oshima, Ama; Hidenobu Misawa, Nagoya, both of Japan

[73] Assignee: NGK Insulators, Ltd., Japan

[21] Appl. No.: 654,588

[22] Filed: Feb. 13, 1991

[30] Foreign Application Priority Data

Mar. 4, 1988 [JP] Japan ............................. 63-51218

[51] Int. Cl.$^5$ ............................................ B29C 47/20
[52] U.S. Cl. ...................... 425/72.1; 137/496; 425/326.1; 425/467
[58] Field of Search ............... 264/539, 540, 573, 526, 264/335, 563, 571, 323, 177.11, 177.12, 211.11, 209.8; 65/18.1, 81, 72, 74, 76, 78; 425/72.1, 326.1, 467, 522, 535, 466; 137/533.21, 516.17, 516.19, 516.15, 496

[56] References Cited

U.S. PATENT DOCUMENTS

| | | | |
|---|---|---|---|
| 2,175,053 | 10/1939 | Ferngren | 264/539 |
| 2,790,994 | 5/1957 | Cardot et al. | 425/532 |
| 3,002,615 | 10/1961 | Lemelson | 264/209.8 |
| 3,329,996 | 7/1967 | Marcus et al. | 264/539 |
| 3,479,422 | 11/1969 | Zavasnik | 264/167 |
| 3,936,260 | 2/1976 | Farrell | 425/535 X |
| 4,020,137 | 4/1977 | Lachner et al. | 264/526 |
| 4,304,542 | 12/1981 | Sauer | 264/526 |
| 4,340,080 | 7/1982 | Lefrancois | 137/533.21 X |
| 4,584,158 | 4/1986 | Nilsson et al. | 264/529 |
| 4,652,292 | 3/1987 | Ziegler et al. | 65/81 X |
| 4,810,458 | 3/1989 | Oshima et al. | 425/72.1 X |

FOREIGN PATENT DOCUMENTS

| | | | |
|---|---|---|---|
| 2715852 | 10/1978 | Fed. Rep. of Germany | 425/467 |
| 603049 | 3/1960 | Italy | 137/533.21 X |
| 62-85906 | 4/1987 | Japan . | |

Primary Examiner—Richard L. Chiesa
Attorney, Agent, or Firm—Parkhurst, Wendel & Rossi

[57] ABSTRACT

An apparatus for producing a sleeve having a closed end by extruding a forming material from a mouthpiece. A core member is arranged in position in the mouthpiece and has a piston member detachably provided in a tip end of the core member. The piston member has an air communication aperture. On the other hand, an outer die is arranged in the mouthpiece for forming an outer configuration of the closed end. As a result, an annular space is formed by the mouthpiece, core member and outer die. The forming material is then supplied into the annular space and extruded to form the closed end of the sleeve. After the outer die has been removed from the mouthpiece, the piston member is caused to slide relative to the mouthpiece and at the same time the air is blown into an inside of the closed end through the air communication aperture of the piston, while the forming material is further supplied and extruded from the mouthpiece to form the closed end sleeve.

3 Claims, 4 Drawing Sheets

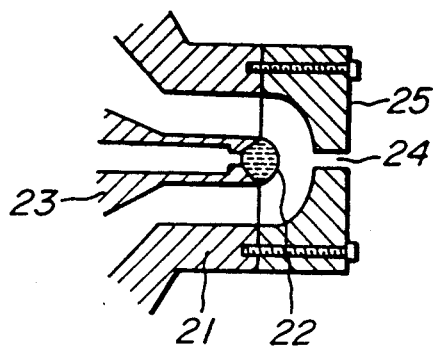
FIG_1a
PRIOR ART
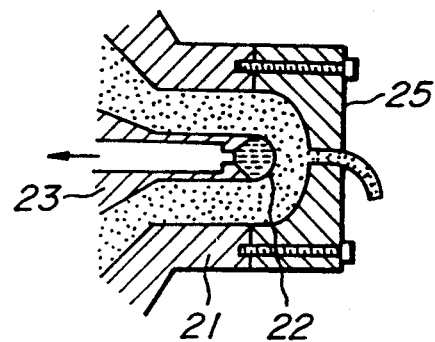
FIG_1b
PRIOR ART
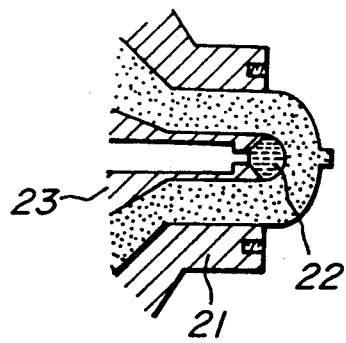
FIG_1c
PRIOR ART
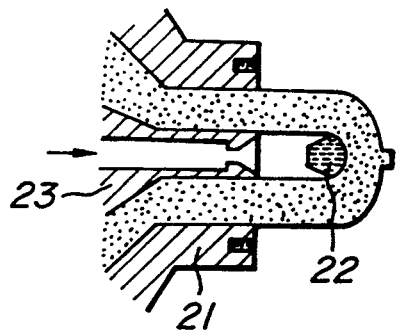
FIG_1d
PRIOR ART

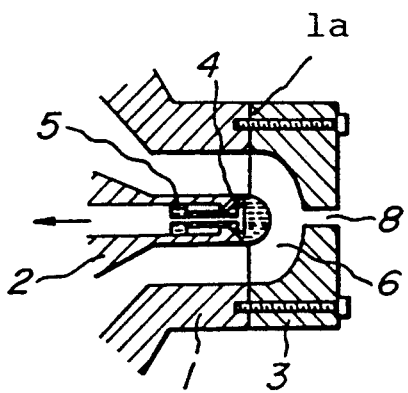
FIG_2a
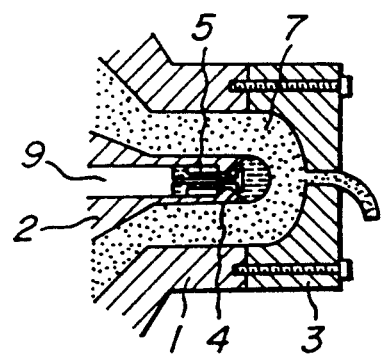
FIG_2b
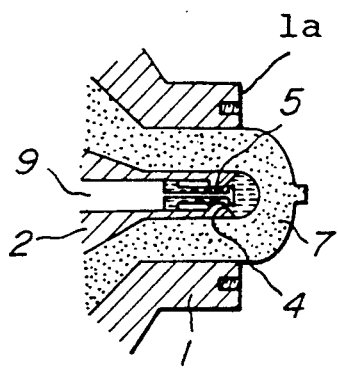
FIG_2c
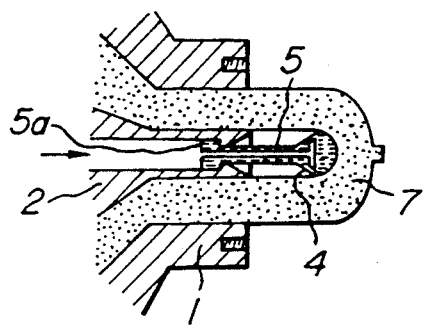
FIG_2d
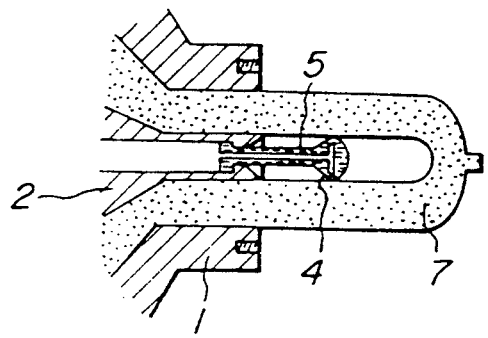
FIG_2e

FIG_3a
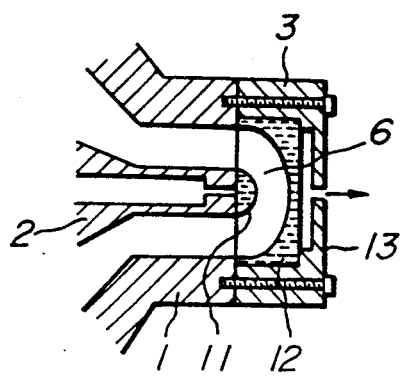
FIG_3b
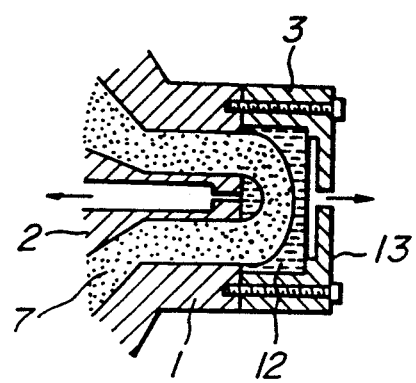
FIG_3c
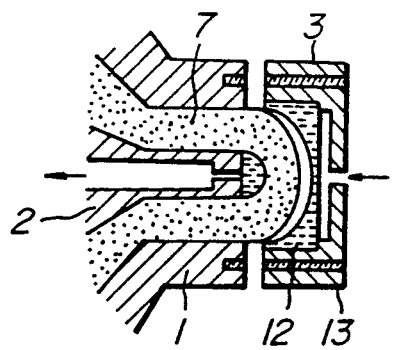
FIG_3d
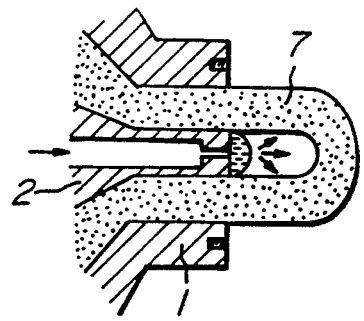

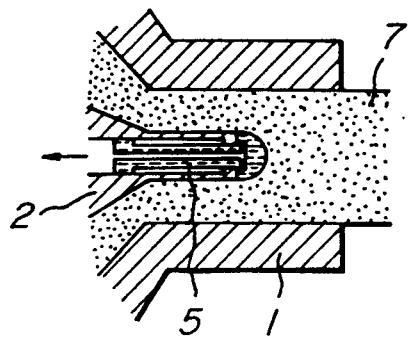
FIG_4a
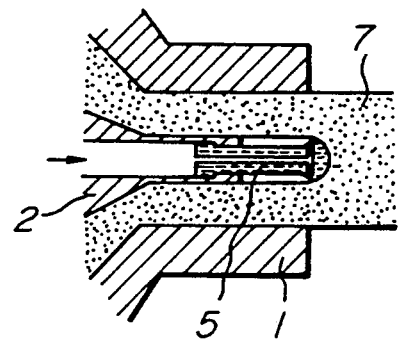
FIG_4b
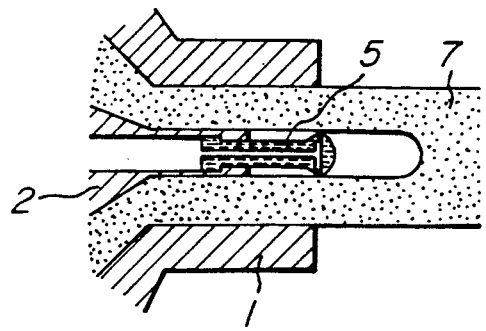
FIG_4c
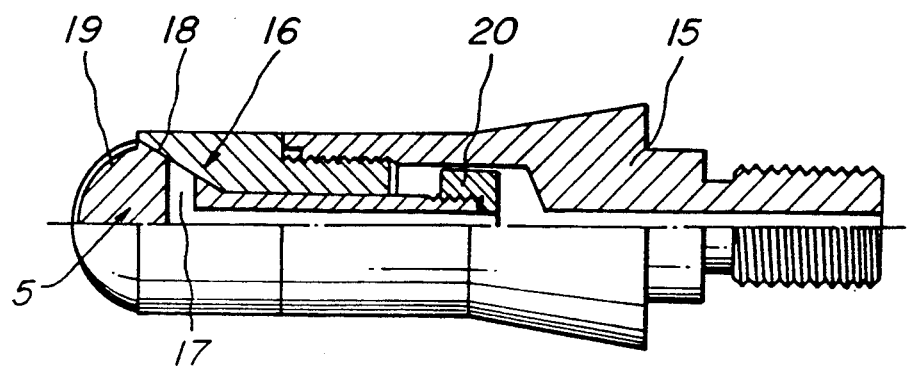
FIG_5

CORE STRUCTURE FOR PRODUCING CLOSED END SLEEVE

This is a Division of application Ser. No. 07/307,497 filed Feb. 8, 1989, now U.S. Pat. No. 5,009,832.

BACKGROUND OF THE INVENTION

This invention relates to a method of producing a closed end sleeve or a sleeve having a closed end, and more particularly to a core structure to be used in the method.

In order to produce closed end sleeves, a press-forming method has been used. However, a long closed end sleeve cannot be produced by the method. It is possible to produce such a long sleeve by attaching an end portion and a sleeve portion of the sleeve separately formed. In this case, however, such an attached sleeve is poor in strength at the attached portion of the sleeve. In order to eliminate this disadvantage of the method, the assignee of this application has proposed in Japanese Patent Application Laid-open No. 62-85,906, a method of producing a closed end sleeve having a closed end by extruding.

FIGS. 1a–1d illustrate the producing processes of the proposed method. As shown in FIG. 1a, a core member 23 having a paraffin tip 22 for forming an inner surface of an end or bottom of the sleeve to be produced is arranged in a mouthpiece 21, and an outer die 25 formed at its center with a through-aperture 24 for forming an outer surface of the end or bottom of the sleeve is arranged in a front end of the mouthpiece 21 to form an annular space by the mouthpiece 21, the core member 23 and the outer die 25. Thereafter, as shown in FIG. 1b, a forming material, for example, a ceramic material for forming the sleeve is supplied into the annular space and slightly extruded. When a minor amount of the ceramic material is extended from the through-aperture 24, the extruding operation is stopped. During this extrusion, the paraffin tip 22 is held in contact with the core member 23 via suction within the core member.

After the outer die 25 has been removed from the mouthpiece 21 as shown in FIG. 1c, the air is supplied into the core member 23 so as to extrude the ceramic material to obtain a cylinder or sleeve having a desired length as shown in FIG. 1d. The remaining paraffin tip at the end or bottom of the cylinder is removed when the cylinder is burned.

In the method of the Japanese Patent Application Laid-open No. 62-85,906, the paraffin tip 22 is used in order to remove the tip used for forming the end of the sleeve when burning the sleeve. However, the paraffin tip 22 is often collapsed by the forming pressure during the extruding process during the formation of the end of the sleeve or before the removal of the outer die 25. As a result, the inner configuration of the end or bottom of the sleeve is deviated from the required configuration.

SUMMARY OF THE INVENTION

It is an object of the invention to provide a method of producing a sleeve having a closed end and a core structure preferably used in the method, which eliminate all the disadvantages in the prior art and obtain the sleeve whose inner configuration at the end does not detrimentally deform.

In order to achieve this object, the method of producing a sleeve having a closed end by extruding a forming material from a mouthpiece according to the invention, comprises the steps of arranging a core member in position in the mouthpiece, said core member having a piston member detachably provided in a tip end of the core member, said piston member being formed with air communication apertures passing therethrough for forming an inner configuration of said closed end, while arranging an outer die in said mouthpiece for forming an outer configuration of said closed end to form an annular space by the mouthpiece, the core member and the outer die; supplying said forming material into the annular space and extruding the material therefrom to form the closed end; removing said outer die from the mouthpiece; and causing said piston member to slide relative to said mouthpiece and at the same time blowing the air into an inside of said closed end through said air communication aperture of the piston member, while further supplying the forming material to extrude the material from said mouthpiece.

In a preferred embodiment, the method comprises steps of arranging a core member in position in said mouthpiece, said core member having at its tip end a tip die made of a porous body for forming an inner configuration of said closed end, while arranging an outer die made of a porous body at an outer end 1a of said mouthpiece for forming an outer configuration of said closed end to form an annular space by the mouthpiece, the core member and the outer die; supplying said forming material into the annular space and extruding the material therefrom, while applying suction to said outer die made of the porous body from its outside to form the closed end; removing said outer die from the mouthpiece by blowing the air against the outer die from its outside; and supplying the air through the tip die made of the porous body into a volume between the formed closed end and the tip die, while further supplying the forming material to extrude the material from said mouthpiece.

In a particular embodiment of the invention, the method comprises steps of inserting a core member in the forming material being extruded in the mouthpiece, and continuing the extruding of the forming material, while blowing the air into the forming material through a through-aperture of the core member.

A core structure to be used for producing a sleeve having a closed end according to the invention comprises a holder member, a cylinder member having a tapered portion at its front end and connected to the holder member, and a piston member having at its front end a hemispherical portion for forming an inner configuration of the closed end and a tapered portion to fit with said tapered portion of the cylinder member and having an air communication aperture, said piston member having at its rear end a stopper for stopping the piston member after its sliding movement through a predetermined distance.

With the arrangement above described, the member for forming the inner configuration of the closed end of the sleeve is constructed by, for example, the piston member made of a metal or the porous body made of a ceramic material and the forming material is extruded by these members. Therefore, closed end sleeves can be reliably produced in predetermined shapes without deforming the inner configurations of the closed ends of the sleeves.

Moreover, in the case where the outer die made of the permeable porous body is used, the outer die can be easily separated from the mouthpiece by blowing the air into the outer die from its outside in separating the outer die from the mouthpiece. Furthermore, the air can be sucked through the outer die in extruding the forming material, so that the aperture at the center of the outer die is not needed. As a result, a protrusion does not occur at the center on the outer surface of the closed end of the sleeve so that a process for amending the outer surface is not needed after the forming process.

The invention will be more fully understood by referring to the following detailed specification and claims taken in connection with the appended drawings.

BRIEF DESCRIPTION OF THE DRAWINGS

FIGS. 1a-1d are sectional views illustrating steps of a method of producing closed end sleeves of the prior art;

FIGS. 2a-2e are sectional views illustrating steps of one embodiment of the method of a closed end sleeve according to the invention;

FIGS. 3a-3d are sectional views illustrating steps of another embodiment of the method according to the invention;

FIGS. 4a-4c are sectional views illustrating steps of a further embodiment of the method according to the invention; and FIG. 5 is a sectional view illustrating one example of the core structure preferably used in the method according to the invention.

DETAILED DESCRIPTION OF PREFERRED EMBODIMENTS

FIGS. 2a-2e are sectional views illustrating one embodiment of the method of producing a sleeve having a closed end according to the invention.

First, as shown in FIG. 2a, a core member 2 is arranged in position in a mouthpiece 1, while an outer die 3 is arranged at an outer end 1a of the mouthpiece 1 for forming an outer configuration of the end or bottom of the sleeve. A piston member 5 formed with an air communication aperture 4 extending therethrough is detachably inserted into a tip end of the core member 2 for forming an inner configuration of the closed end of the sleeve. As a result, an annular space is formed by the mouthpiece 1, the core member 2, the piston member 5, and the outer die 3.

Then, as shown in FIG. 2b, a forming material 7 of, for example, a ceramic material is supplied into the annular space 6 and slightly extruded through a through-aperture 8 formed at a center of the outer die 3 to an extent that a slight amount of the ceramic material 7 is extended out of the through-aperture 8 to form the end or bottom of the sleeve. During such an operation, suction is applied to a through-aperture 9 of the core member 2 to prevent the piston member 5 from moving from the core member 2.

After the outer die 3 has been removed from the mouthpiece 1 as shown in FIG. 2c, the air is blown through the center through-aperture 9 of the core member 2, while the ceramic material 7 is further extruded so that the piston member 5 is slid until a stopper 5a of the piston member 5 abuts against the inside of the tip end of the core member 2 as shown in FIG. 2d.

Finally, as shown in FIG. 2e, the ceramic material 7 is further extruded so as to form a ceramic cylinder having a desired length to obtain a required closed end sleeve.

FIGS. 3a-3d illustrate another embodiment of the method according to the invention, wherein like components are designated by the same reference numerals as those used in the first embodiment and will not be described in further detail.

In this embodiment, first a core member 2 is arranged in position in a mouthpiece 1, and an outer die 3 is arranged at an outer end of the mouthpiece 1 as shown in FIG. 3a. A tip die 11 made of a porous body is provided on the tip of the core member 2 for forming an inner configuration of the closed end of the sleeve. The porous body may be made of a ceramic material. Moreover, the outer die 3 comprises an outer die member 12 made of a porous body and a holder 13 so that the air can be blown into and out of the annular space 6 through the outer die member 12.

As shown in FIG. 3b, the ceramic material 7 is then supplied into the annular space 6 and extruded to form an end or bottom of the sleeve. At the same time as the extrusion of the ceramic material, the air in the annular space 6 is removed, through suction, through the tip die 11 and a through-aperture of the core member 2 as shown by the arrow on the left side in FIG. 3b and the air in the annular space 6 is also removed through suction, through the outer die member 12 as shown by the arrow on the right side in FIG. 3b. After a lapse of a predetermined time, the extrusion and the suction are completed.

Thereafter, the outer die 3 is removed from the mouthpiece 1 as shown in FIG. 3c. At the same time as the removal of the outer die 3, the air in the annular space 6 is removed, through suction through the tip die 11 and the air in the atmosphere is blown through the outer die member 12 into the annular space 6. Therefore, the removal of the outer die 3 from the mouthpiece 1 can be easily and rapidly effected.

Finally, the air is blown into the annular space 6 through the through-aperture, while the ceramic material 7 is further extruded so as to form a cylinder having a predetermined length to obtain a required closed end sleeve having a closed end.

The invention is not limited to the embodiments above described and various changes and modifications can be made in the invention. For example, the outer die in the first embodiment shown in FIGS. 2a-2e may be made of a porous body having at its center a through-aperture which can obtain a closed end sleeve of good quality. The porous body may be made of a ceramic material. Moreover, by applying the method shown in FIGS. 2a-2e a hollow body can be obtained on the way of the extrusion of a solid body. This method will be explained in more detail by referring to FIGS. 4a-4c.

As shown in FIG. 4, a core member 2 is arranged in a mouthpiece 1 during extrusion of the ceramic material. After the piston member 5 has arrived at a predetermined position as shown in FIG. 4b, the extrusion of the ceramic material 7 is continued, while air is blown into the core member 2 through a through-aperture of the piston member 5, thereby obtaining a required closed end sleeve.

FIG. 5 is a sectional view illustrating one example of a core structure comprising a core member 2 and a piston member 5 preferably used in the method shown in FIGS. 2a-2e. In this embodiment, the core member 2 comprises a holder member 15 and a cylinder member 16 connected to the holder member 15 and having at its front end an inner tapered portion. The piston member 5 is formed at its one end with a tapered portion 18 having an air communication aperture 17 and adapted to fit in the inner tapered portion of the cylinder member 16 and with a hemispherical portion 19 for forming the inner configuration of the end of the sleeve. Moreover, the piston member 5 is formed at the other end with a stopper 20 for stopping a further movement of the piston member 5 after its sliding movement of a constant distance.

The respective members are made of a metal, for example, a hard steel such as S45C (Japanese Industrial Standard). Outer surfaces of the holder member 15 and the cylinder member 16 and the hemispherical portion 19 of the piston member 5 which are adapted to be in contact with the moving ceramic material are plated by, for example, chromium plating. Moreover, TEFLON (polytetrafluoroethylene is more preferable for the coating on the hemispherical portion 19 of the piston member 5.

With the core member 2 and the piston member 5 explained with reference to FIG. 5, when the air is sucked through the air communication aperture 17, the tapered portions of the cylinder member 16 and the piston member 5 are maintained in close contact with each other. On the other hand, when the air is blown into through the air communication aperture 17, the air is jetted through a clearance between the tapered portions so that the piston member 5 is slidable until the stopper 20 abuts against the cylinder member 16 through the core member 2.

As can be seen from the above description, according to the invention, the member for forming the inner configuration of the closed end of the sleeve is constructed by, for example, the piston member made of a metal or the porous body made of a ceramic material for extruding the forming material. Therefore, closed end sleeves can be reliably produced in predetermined shapes without deforming the inner configurations of the closed ends of the sleeves.

Moreover, in case that the outer die made of the permeable porous body is used, the outer die can be easily separated from the mouthpiece and a protrusion does not occur at a center on an outer surface of the closed end of the sleeve so that a post-process for amending the outer surface is not needed.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A core structure for an extrusion apparatus for producing a sleeve having a closed end, said core structure comprising:
    a holder member;
    a cylinder member comprising a tapered portion at a front end thereof, a tip of said front end being substantially flat, said cylinder member being connected to said holder member; and
    a piston member slidably arranged in said cylinder member, said piston member comprising a hemispherical portion at a front end thereof for forming an inner configuration of the closed end of the sleeve, a rearward portion of said hemispherical portion being tapered to fit with said tapered portion of said cylinder member, an air communication aperture for providing air from an interior of said core structure to an exterior thereof, and a stopper provided at a rear end of said piston member for limiting an extension of said piston member from said cylinder member;
    wherein an outer diameter of said cylinder member at said tip of said front end is larger than the largest diameter of said hemispherical portion of said piston member.

2. The core structure of claim 1, wherein said tapered portion of said cylinder member is inwardly tapered toward an interior of said core structure, and said tapered portion of said piston member is tapered to fit into the inwardly tapered portion of said cylinder member.

3. The core structure of claim 1, wherein at least said hemispherical portion of said piston member is porous.

* * * * *